Dec. 28, 1926.
P. H. MYERS
1,612,463
HEAD GATE FOR IRRIGATION PURPOSES
Filed June 28, 1926  2 Sheets-Sheet 1
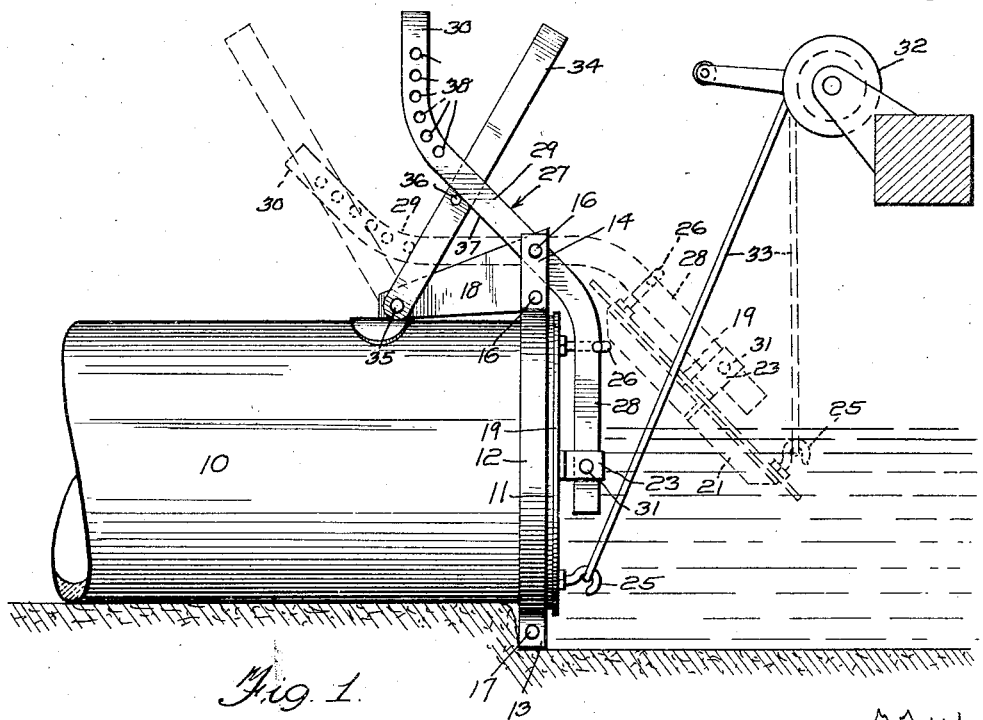
Fig. 1.
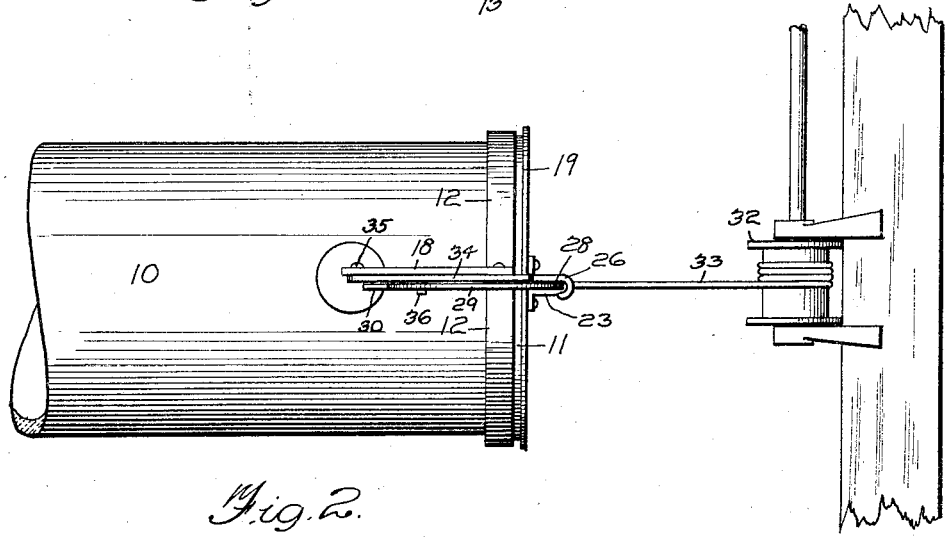
Fig. 2.
Fig. 2ᴬ.
Inventor
P. H. MYERS,
By B. P. Hilburn
Attorney

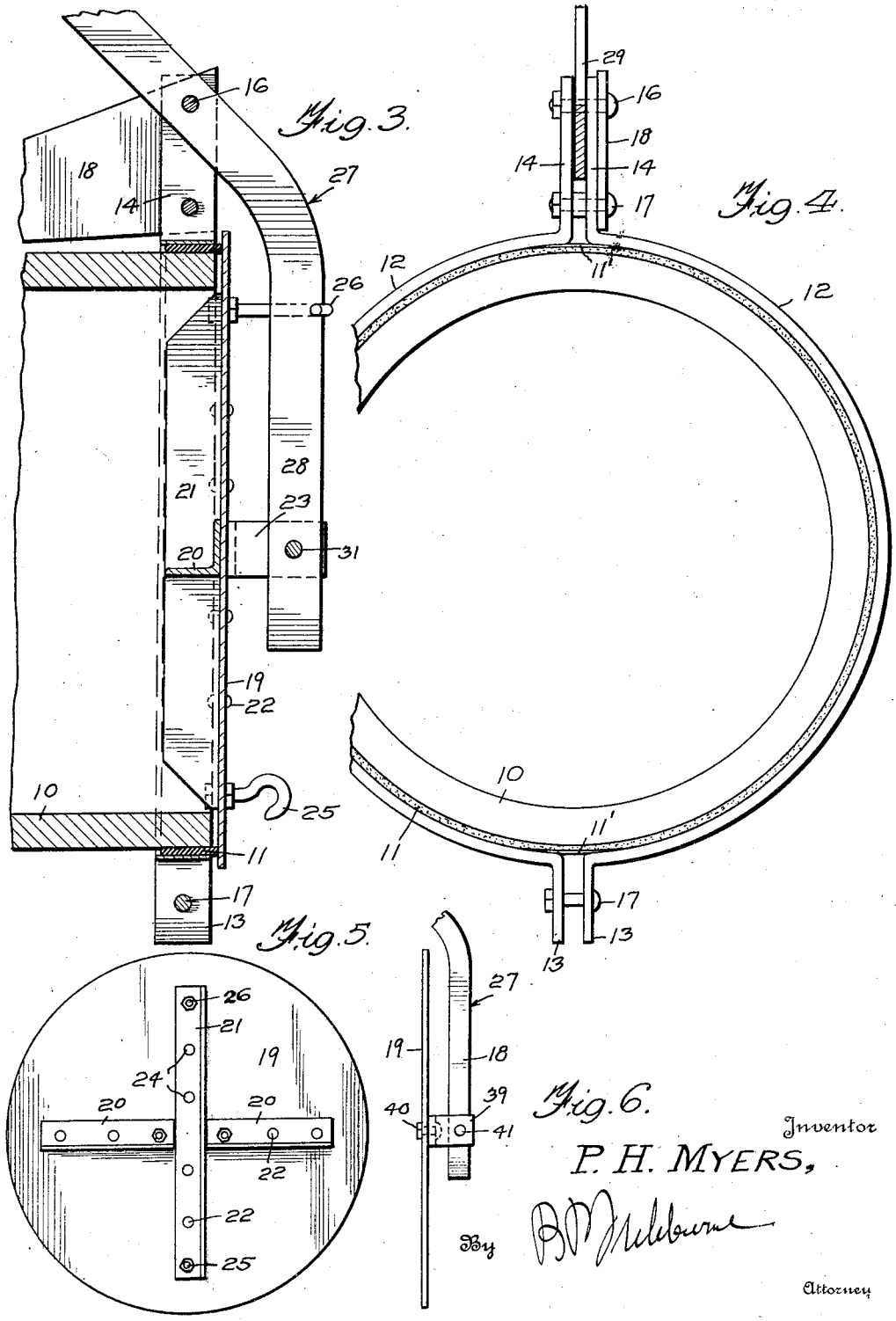

Patented Dec. 28, 1926.

1,612,463

UNITED STATES PATENT OFFICE.

PATRICK H. MYERS, OF TARHEEL, NORTH CAROLINA.

HEAD GATE FOR IRRIGATION PURPOSES.

Application filed June 28, 1926. Serial No. 119,100.

My invention relates to improvements in head gates for irrigation purposes.

Important objects of the invention are to provide apparatus of the above mentioned character having means whereby a tight joint is effected when the gate is closed; to provide means for firmly clamping the gate to its seat, in addition to the water pressure, when necessary; to provide means whereby the gate may be opened through the medium of a windlass, when necessary, and to properly distribute the pull upon the gate; to provide apparatus of the above mentioned character, the parts of which are separable, and may be readily repaired or substituted, when necessary; to provide means whereby the gate will close quickly and thus save water; and to improve the construction of the apparatus in general for increasing its efficiency.

Other objects and advantages of the invention will be apparent during the course of the following description.

In the accompanying drawings, forming a part of this specification, and in which like numerals are employed to designate like parts throughout the same, Figure 1 is a side elevation of apparatus embodying my invention, Figure 2 is a plan view of the same, Figure 2ª is a longitudinal section through the saddle, Figure 3 is a central vertical section through the gate, associated elements being shown in elevation, Figure 4 is a side elevation of the gate, Figure 5 is an elevation of the inner side of the gate, and, Figure 6 is an edge elevation of a modified form of the gate.

In the drawings, wherein for the purpose of illustration, is shown a preferred embodiment of my invention, the numeral 10 designates a conduit adapted to be used for irrigation purposes. Surrounding the intake end of this conduit 10 is an annular gasket 11, preferably formed of rubber reinforced with fabric. The forward edge of this gasket projects a suitable distance beyond the intake end of the conduit 10, and constitutes a seat for the gate, to be described. The annular gasket is clamped to the exterior of the conduit by means of a clamping ring, embodying ring sections 12, provided at their ends with radial extensions 13 and 14. The extensions 13 are adjustably connected by means of bolts 16 and 17. Thin curved plates 11' are arranged to span the openings between the extensions, to prevent the gasket from buckling as shown. A brace 18 is secured to one extension 14, through the medium of the bolts 16, and the rear end of this brace is adapted to engage with the top of the conduit, as shown. If desired, the brace 18 may be provided with a saddle to engage with the top of the conduit to more evenly distribute the load of the same.

The numeral 19 designates a gate, preferably formed of a section of plate metal, and this gate is of larger diameter than the conduit 10, so that it can not enter the bore of the conduit. When the gate is used in connection with a large conduit, the pressure exerted thereon by water is considerable and I prefer to stiffen or reinforce the gate by means of radially disposed angle-irons 20 and 21, arranged upon the inner face thereof. The angle-irons 20 are secured to the gate by means of bolts 22, and certain of these bolts engage with brackets 23, and serve to attach the same to the forward face of the gate. The vertical angle-iron 21 is secured to the gate by means of bolts or rivets 24. A hook bolt 25 is attached to the lower portion of the gate 19, is arranged upon the forward side thereof, and is also attached to the lower end of the angle-iron 21. A second hook bolt 26 is arranged upon the forward side of the gate near its upper portion, and is also attached to the angle-iron 21. Co-acting with the gate is a gate-lever 27, embodying an inner portion 28, which is generally parallel with the gate and arranged in advance of the same, an intermediate portion 29, which is inclined so that it is disposed at an angle of about 45° to the forward portion 28, and an outer end portion 30, which is generally substantially parallel with the inner end portion 18. The intermediate inclined portion 29 functions as a cam portion, as will be explained.

The intermediate portion 29 is apertured between its ends, for the reception of the upper bolt 16, and this intermediate portion is positioned between the vertical extensions 14. The gate-lever is pivoted upon the bolt 16, to swing in a substantially vertical plane. The inner end portion 28 of the lever is arranged between the brackets 23, and is pivoted thereto by means of a bolt 31 or the like. The upper hook 26 engages over the inner portion 28 of the lever, and serves to substantially uniformly distribute the pull exerted upon the hook 25, to the gate. When the gate 19 is made in a relatively large diameter, as when used in connection with a large conduit, it is ordinarily preferable or necessary to open the same by means of a windlass rather than by means of the lever 27. When this is to be done, I suitably support a windlass 32 in advance of the gate, and this windlass carries a cable 33, the free end of which is adapted to engage the hook 25. By turning the windlass the cable is wound thereon, and will pull the gate 19 open. During this pulling action, the gate will tend to turn upon its pivot 31, and the hook 26 will engage the inner portion 18 of the lever, thus properly distributing the pull or strain upon the gate. When the gate is opened it turns with the lever 27, upon the pivot 16.

The numeral 34 designates a lock-lever, the lower end of which is pivoted at 35, to the brace 18. This lock-lever is provided between its ends with a laterally extending extension or lock-pin 36. The parts may be so adjusted, that the pin 36 may engage with rear edge 37 of the intermediate inclined portion of the lever 27. When the lever 34 is swung forwardly, there is a cam action, and the gate-lever will then function to firmly press the gate 19 upon its gasket or seat 11, should additional pressure be desired. The lock-lever 34 may also be employed for holding the gate in partly or completely opened positions, and to accomplish this, the parts are so adjusted that the lock-pin 36 may be inserted in selected openings 38. There is sufficient side play at the pivot 35, whereby the lock-lever may be laterally adjusted, to insert the pin 36 into the openings 38.

The gate shown and described is well adapted to be made in large sizes, and to be used in connection with a windlass, but the invention is in no sense restricted to this particular use. This gate may also be made in smaller sizes, and may be opened and closed without the windlass, through the manipulation of the gate-lever 27.

In Figure 6, I have shown a modified form of the invention. In this figure the gate 19 is not equipped with the angle-irons 20 and 21, and the gate is provided upon its outer face with a generally U-shaped bracket or socket 39, secured to the gate by means of a bolt 40 or the like. This bracket is equipped with a bolt 41, for pivotal connection with the inner end portion 18 of the gate-lever 27. The hook bolts 25 and 26 are also omitted, together with the windlass. All other parts of the apparatus remain identical. The gate 19 thus equipped is well adapted to be made in smaller diameters, for use with small conduits, and is opened and closed by the gate-lever.

The operation of the first form of the apparatus is as follows:

When it is desired to open the gate, the lock-lever 34 is shifted to the rear position, so that its pin 36 will not engage with the gate-lever 27. The windlass 32 is now turned, and the cable 33 will open the gate. The gate may be locked in a partly or wholly opened position, by manipulation of the lock-lever and gate-lever 27 to bring the lock-pin 36 into a selected opening 38. The lock-lever may also be employed to lock and clamp the gate in the closed position. When the gate is closed, the lever 34 may be swung forwardly, and its lock-pin will engage the rear edge 37 of the intermediate portion of the lever, thereby producing a cam action, tending to turn the gate-lever upon its pivot 16, in a direction to move the gate rearwardly.

It is thought that no further explanation in connection with the second form of the invention is necessary.

It is to be understood that the forms of my invention, herewith shown and described, are to be taken as preferred examples of the same, and that various changes in the shape, size and arrangement of parts may be resorted to without departing from the spirit of my invention or the scope of the subjoined claims.

Having thus described my invention, I claim:—

1. In a head-gate, a gasket mounted upon the periphery of a conduit and projecting forwardly beyond the same to form a seat, a split ring surrounding the gasket to clamp the same to the conduit, said ring embodying spaced radial extensions, a lever pivoted to the radial extensions, and a gate pivotally connected with the lever to be shifted into and out of engagement with the gasket.

2. In a head-gate, a gasket to be mounted upon the periphery of a conduit and extending forwardly beyond the end thereof to form a seat, a ring formed in sections and surrounding the gasket to clamp the same upon the conduit, said sections being provided at their ends with pairs of outwardly projecting extensions, adjustable means connecting the extensions in one pair, a lever pivoted to the extensions in the other pair, and a gate pivoted with the lever and adapted to be shifted into and out of engagement with the gasket.

3. In a head-gate, a gasket to be mounted upon the end of a conduit to form a seat, a contractable ring surrounding the gasket to clamp it to the conduit, a gate-lever pivotally mounted upon the ring, and a gate pivotally connected with the lever to be shifted into and out of engagement with the gasket.

4. In a head-gate, a gasket to be mounted upon the end of a conduit to form a seat, a contractable ring surrounding the gasket to clamp it to the conduit, an extension carried by the ring, a brace attached to the extension and engaging the conduit, a lever pivoted to the extension, and a gate pivoted to the lever to engage the gasket.

5. In a head-gate, a gate to close the end of a conduit, a support mounted upon the conduit, a lever pivoted to the support and pivotally connected with the gate near its center, an attaching element connected with the gate near its edge, an oppositely arranged attaching element connected with the gate near its edge and engaging the lever at a point remote from its connection with the gate, and pulling means for engagement with the first named attaching element.

6. In a head-gate, a gate to close the end of a conduit, a support mounted upon the conduit, a lever pivoted to the support and pivotally connected with the gate near its center, a reinforcing element extending substantially diametrically of the gate and attached thereto, an attaching element secured to one end of the reinforcing element, a second attaching element secured to the opposite end of the reinforcing element and engaging said lever, and pulling means for connection with the first named attaching element.

7. In a head-gate, a gasket mounted upon the periphery of a conduit and extending forwardly beyond the end thereof to form a seat, a ring surrounding the gasket to clamp the same to the conduit, said ring having a generally radial extension, a brace attached to the extension and extending longitudinally of the conduit and engaging therewith at a point spaced from the ring, a lever pivoted to said extension, and a gate pivotally connected with the lever for engaging and disengaging the gasket.

8. In a head-gate, a gasket arranged upon the periphery of a conduit and projecting forwardly beyond the same to form a seat, a ring surrounding the gasket to clamp the same to a conduit and having a generally radial extension, a brace extending longitudinally of the conduit and attached to the extension and engaging the conduit at a point remote from such extension, a lever pivotally connected with the extension and having a cam face, a gate pivotally connected with the lever to engage and disengage the gasket, and a lock lever pivoted upon the brace near the end thereof, which is remote from said extension and having a part to engage with the cam face of the first named lever.

9. In a head-gate, a pivoted lever supported near one end of a conduit and having an intermediate angularly arranged cam face and an outer portion provided with opening or openings, a gate secured to the lever to cover the end of the conduit, a lock lever pivotally supported near the first named lever and having a part to engage the cam face, said part being adapted for insertion within said opening or openings.

10. In a head-gate, a band surrounding a conduit near its end and having a generally radial extension, a brace attached to the radial extension and extending longitudinally of the conduit and engaging therewith at a point remote from said extension, a lever pivoted upon the extension and having a cam face, a gate pivotally connected with the lever to cover and uncover the end of the conduit, and a lock lever pivotally mounted upon said brace near the conduit engaging end thereof and having a part to engage with the cam face of said lever.

11. In a head-gate, a gasket arranged adjacent to the end of a conduit to form a seat, a contractible band surrounding the gasket to hold the same upon the conduit, a brace extending longitudinally of the conduit and attached to the band and engaging with the conduit at a point remote from said band, a lever pivotally connected with the brace and adjacent to said band, said lever having a cam face, a gate carried by the lever to engage and disengage said gasket, and a lock lever pivoted to said brace near its conduit engaging end and having a part to engage with the cam face of the first named lever.

In testimony whereof I affix my signature.

PATRICK H. MYERS.